US009973592B2

(12) United States Patent
McEvilly et al.

(10) Patent No.: US 9,973,592 B2
(45) Date of Patent: *May 15, 2018

(54) SYSTEM AND METHOD FOR EXPERIENCE-SHARING WITHIN A COMPUTER NETWORK

(71) Applicant: Photopon, Inc., Hackettstown, NJ (US)

(72) Inventors: Bradford Alexander McEvilly, Layton, NJ (US); Michael Scott Gutkin, Denville, NJ (US)

(73) Assignee: PHOTOPON, INC., Hackettstown, NJ (US)

(*) Notice: Subject to any disclaimer, the term of this patent is extended or adjusted under 35 U.S.C. 154(b) by 0 days. days.

This patent is subject to a terminal disclaimer.

(21) Appl. No.: 15/465,748

(22) Filed: Mar. 22, 2017

(65) Prior Publication Data

US 2017/0257455 A1    Sep. 7, 2017

Related U.S. Application Data

(63) Continuation of application No. 13/667,678, filed on Nov. 2, 2012, now Pat. No. 9,635,128.

(60) Provisional application No. 61/554,634, filed on Nov. 2, 2011.

(51) Int. Cl.
*H04L 29/08*    (2006.01)
*G06Q 30/02*    (2012.01)
*G06Q 50/00*    (2012.01)

(52) U.S. Cl.
CPC ....... *H04L 67/306* (2013.01); *G06Q 30/0261* (2013.01); *G06Q 50/01* (2013.01)

(58) Field of Classification Search
None
See application file for complete search history.

(56) References Cited

U.S. PATENT DOCUMENTS

| 5,910,987 | A | 6/1999 | Ginter et al. |
| 6,948,070 | B1 | 9/2005 | Ginter et al. |
| 7,069,451 | B1 | 6/2006 | Ginter et al. |

(Continued)

FOREIGN PATENT DOCUMENTS

| JP | 2008225604 A | 9/2008 |
| KR | 1020080093085 A | 10/2008 |

OTHER PUBLICATIONS

International Search Report and Written Opinion for International Application No. PCT/US13/027455, dated Jun. 21, 2013, 12 Pages.

(Continued)

*Primary Examiner* — Jeffrey R Swearingen
(74) *Attorney, Agent, or Firm* — Maldjian Law Group LLC

(57) ABSTRACT

A system and method for providing a communication between users of a computer network are provided, the method including the steps of storing, in a database, received geo-location information, object information, brand information or other information, from a user; providing to the user a subset of previously stored digital media templates from the database for user selection; combining a user-selected digital media template with a user-selected media data object file received from the user; and tagging the geo-location information, object information, brand information or other information, to the combined user-selected digital media template and user-selected media data object file for communicating between users of the computer network.

38 Claims, 14 Drawing Sheets

(56) References Cited

U.S. PATENT DOCUMENTS

| | | |
|---|---|---|
| 7,095,854 B1 | 8/2006 | Ginter et al. |
| 7,133,845 B1 | 11/2006 | Ginter et al. |
| 7,233,948 B1 | 6/2007 | Shamoon et al. |
| 7,624,053 B1 | 11/2009 | Molotsi et al. |
| 7,802,291 B2 | 9/2010 | Campbell |
| 8,341,139 B1 | 12/2012 | Ogilvie et al. |
| 8,428,453 B1 | 4/2013 | Spiegel et al. |
| 8,543,460 B2 | 9/2013 | Svendsen et al. |
| 8,548,855 B2 | 10/2013 | Svendsen et al. |
| 8,554,627 B2 | 10/2013 | Svendsen et al. |
| 8,667,394 B1 | 3/2014 | Spencer |
| 8,775,972 B2 | 7/2014 | Spiegel |
| 8,909,725 B1 | 12/2014 | Sehn |
| 8,914,752 B1 | 12/2014 | Spiegel |
| 9,483,775 B1 | 11/2016 | Kim et al. |
| 2002/0026359 A1 | 2/2002 | Long et al. |
| 2002/0138291 A1 | 9/2002 | Vaidyanathan et al. |
| 2002/0160766 A1 | 10/2002 | Portman et al. |
| 2003/0048294 A1 | 3/2003 | Arnold |
| 2003/0110130 A1 | 6/2003 | Pelletier |
| 2007/0130467 A1 | 6/2007 | Beck et al. |
| 2007/0168251 A1 | 7/2007 | Hilbert et al. |
| 2007/0250901 A1 | 10/2007 | McIntire et al. |
| 2008/0028039 A1 | 1/2008 | Christopher |
| 2008/0072261 A1 | 3/2008 | Ralston et al. |
| 2009/0070665 A1 | 3/2009 | Chijiiwa et al. |
| 2009/0132938 A1 | 5/2009 | Gardner et al. |
| 2009/0136088 A1 | 5/2009 | Tabata |
| 2009/0248505 A1 | 10/2009 | Finkelstein et al. |
| 2010/0082778 A1 | 4/2010 | Muilenburg et al. |
| 2010/0120450 A1 | 5/2010 | Herz |
| 2010/0121718 A1 | 5/2010 | Alandietz |
| 2010/0138491 A1 | 6/2010 | Churchill et al. |
| 2010/0254569 A1 | 10/2010 | Vial |
| 2010/0293448 A1 | 11/2010 | Rand et al. |
| 2010/0318407 A1 | 12/2010 | Leff et al. |
| 2010/0318894 A1 | 12/2010 | Billharz et al. |
| 2011/0066500 A1 | 3/2011 | McCrossin et al. |
| 2012/0123871 A1 | 5/2012 | Svendsen et al. |
| 2012/0124176 A1 | 5/2012 | Curtis et al. |
| 2012/0158513 A1 | 6/2012 | Schoen et al. |
| 2013/0006750 A1 | 1/2013 | Simmons, Jr. |
| 2013/0151950 A1 | 6/2013 | McEvilly et al. |
| 2013/0218968 A1 | 8/2013 | McEvilly et al. |
| 2013/0346220 A1 | 12/2013 | Svendsen et al. |
| 2014/0237395 A1 | 8/2014 | Ogilvie et al. |
| 2014/0310319 A1 | 10/2014 | Zhao et al. |
| 2014/0359024 A1 | 12/2014 | Spiegel |
| 2014/0359032 A1 | 12/2014 | Spiegel et al. |

OTHER PUBLICATIONS

International Search Report and Written Opinion for International Application No. PCT/US12/63350, dated Jan. 29, 2013, 14 Pages.

100

*1006*

FINAL MEDIA OBJECT GENERATED BY PERSONAL PHOTO 2 AND GYM TEMPLATE #3 (THAT THE USER SELECTED TO USE)

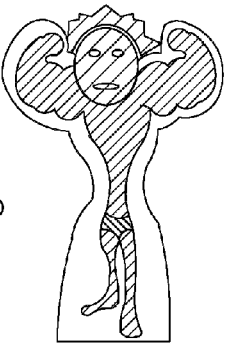

THIS MESSAGE WAS SENT BY SOME GYM BRAND

AVERAGE RATING ☆ ☆ ☆ ☆ ☆

SOME OF THE ...

GYM LOGO

USER PERSONALIZED MESSAGE

FINAL PROMOTIONAL MEDIA OBJECT GENERATED BY PERSONAL PHOTO 2 AND GYM TEMPLATE #4 (THE COUPON THEME THAT THE USER SELECTED TO USE)

------------SAVE 50%------------

GYM LOGO

RATED 4/5 BY JOHN SMITH, JUNE OF 2014
YES! THIS IS A VALID OFFER
  PROMO CODE: 277240

*FIG. 10D*

SYSTEM AND METHOD FOR EXPERIENCE-SHARING WITHIN A COMPUTER NETWORK

CROSS-REFERENCE TO RELATED APPLICATIONS

This application is a continuation of U.S. application Ser. No. 13/667,678 filed Nov. 2, 2012, which in turn claims the benefit of U.S. Provisional Application Ser. No. 61/554,634, filed Nov. 2, 2011, both of which are incorporated herein by reference in their entireties.

BACKGROUND

Field of the Invention

Embodiments of the present invention generally relate to a system and method for sharing real world experiences through a computer network and in particular a system and method for sharing these experiences through sharing semantic and non-semantic media content via a computer network.

Description of Related Art

People who are active in social media via a global computer network, e.g., the internet, tend to enjoy expressing where they are and what they are doing at all times and at any given moment. However, even though social networks have long provided a "check-in" application for their users at different locations, this method does not capture the entirety of the user's experience at a particular private or social establishment such as a bar, restaurant, coffee shop or other place of business. In addition, fellow consumers in the user community do not currently have an easy way to check out the past or current experiences of other likeminded social networkers who may frequent the same locations or like the same object or brands of products or services.

Visual social storytelling is a growing trend with multiple mobile image sharing applications in the market, most notably in recent times, for example, Instagram. People tend to have a need to express themselves by way of experiences and often times by way of media files or multi-media files. They have always been amused by photography (or digital imagery or video) and the ability of a photograph or video semantic or non-semantic, i.e., with or without audio or text, to capture the experience of a friend or acquaintance at any given time at any given location and enjoying a certain establishment, or object, or branded product/service.

Equally important, from the perspective of a business owner, or object, or brand manager, it may be difficult to engage customers in the social networking environment and create establishment, or object, or brand loyalty in a fun and positive way when those would-be customers may not be viewing or hearing traditional forms of advertising (e.g., TV, radio or print ads) for the majority of the day. For example, as mentioned above, new generations of customers are on-the-go and mobile, using their mobile devices to communicate, but patronizing certain business establishments, products, etc., just the same. Also, there is no centralized way to efficiently manage the "check-ins" at a particular location because social networks are generally separate entities with separate motives. That is, there is no centralized platform within the many social platforms for businesses to promote their object or brands and establishments to consumers.

Consumers, hereinafter also referred to as "users," have to find their own ways to describe where they are, what they are doing, or what object or brand they are interacting with, in their digital images, e.g., photographs and videos, or audio files. In addition, object or brand companies and business establishments have no way of making it attractive to this new social network consumer by creating engaging visual "themes" or other representations of their object or brands, locations, and the stories they have to tell.

Finally, there are many social networks with many different check-in widgets confined to each particular network with no way for businesses to "efficiently" manage a particular user of a particular networks experience. If an establishment or object or brand wants to give a history or share other details specific to their object or brand (and likewise to their location), there is no centralized way of doing so because social networks are separate entities with separate motives.

An overall centralized record or file has no way of being generated with existing networks that can give insight for visitors of a location, or object, or brand of past recorded experiences with that object or brand or location (or experience in general of itself). There is also no known means to capitalize on such user experiences from the business establishment, or object, or brand company's perspective.

Thus, there is a need for a more effective system and method that may appeal to both social network consumers and businesses alike in the social networking environment or any other computer networking environments, where users can express themselves by identifying one or multiple object(s), or brand(s), or locations and providing relevant and enticing first-hand experience-based information along with that object, or brand, or location in order to provide more powerful, efficient, and effective content for social networking purposes, object or branding purposes or both, either by the user's own choosing, one or more past user's choosing, or in conjunction with a marketing administrator.

SUMMARY

Embodiments of the present invention include a system and method for businesses and users, operating within, for example, a web-based social network or computer network, which comprises allowing users to digitally indicate a location using their mobile devices, e.g., a smart phone, tablet, and the like, and then create and post digital postcards based upon geo-location information and then may post the integrated digital postcard on one or more social networks to which the users are members. Alternative to location coupling, the users may create, couple and combine digital postcards based upon user object identification, such as by way of personal identification, or if a thing or product, one dimensional bar codes, two dimensional codes such as QR codes, and the like. The users may also create, couple or combine digital postcards based upon keyword searching and searches or any other user provided data.

The user may create digital images such as photographs, videos, holograms, animated photograph sequences, other photographic data objects, and the like (collectively hereinafter referred to as a "media data object file"), and choose templates (previously created or created by the user or a marketing administrator) that can overlay, underlay, watermark or frame the media data object file(s), that the user creates or has already created at a particular location, or object or brand. Importantly, when used throughout this application to describe embodiments of the present invention, the term "object" in the phrase "media data object file" means a binary representation of media as that term and definition are understood by one of ordinary skill in the art of computer science, whereas the term "object" when used by itself or in connection with "object identification" means a person or thing that is either identified by an object identification code like a QR code or if it is a famous person for instance is identified by that person's name and likeness. One of many examples of a "thing" is a beer mug, for instance, which is explained in context with embodiments of the present invention herein below.

One fun example would be to allow a user to select a template of a famous person (i.e., the "object") and combining that template and/or coupon with the user's own created digital image (the "media data object file") so that it appears when the digital postcard is created (which is the template framing the media data object file) that the user was physically with the famous person. But in reality, the user was not and is merely simulating the chance encounter.

The term "digital postcard" means any and all combinations of one or more templates and one or more media data object files.

Thus, embodiments of the present invention are not solely directed to coupling a geo-location to a template or a generated coupon but rather coupling templates to people, things, products, services, etc.

The overlay, underlay, watermark or frame may comprise information about the location, or at least one object, or at least one brand endorsed by the user. The indicia may also include coupons or other promotional messages, such as specials, discounts or offers that tie to the location, the object by way of object identification codes, or brand(s) being endorsed by the user, or any combination thereof. For example, a user may post a digital postcard that includes a digital image of the user with a template having a coupon about the object, wherein the coupon and the template itself are chosen or created based upon the object code provided by the user. In a very specific example, and by no way limiting the scope of the present invention, the user may scan a QR code from an object or product and then search for a template that corresponds with the QR code. The same or different QR code may also create a coupon to be used in connection with the template and to overlay that coded template with the coded coupon over the user's media data object file.

When posted, information about the location, or object, or branded products or services may be synthesized with the provided (or created) template using information about the location posted by the user (or other users pulled from an existing database, e.g., through crowd sourcing) to "brand" the experience in a meaningful way that is fun (e.g., a fun themed template), or simply "loyal" (by way of a template of a company's logo and/or its products, e.g., currently being consumed by the user at the location), or to encourage patronage of the establishment at the user's location, or information about the object, or information about the branded product or service purchase by way of, for example discounts, specials, promotions, or coupons. Specifically, the template may include coupons or other incentive-based indicia for sponsoring, promotion, endorsing or otherwise attracting all those that receive the posted digital postcard from the user, across one or more social computer networks, to patronize the establishment and/or check out the famous person the user is with, or purchase the branded product(s)/services being featured in the digital postcard.

In an embodiment, a "marketing administrator" for a object, or branded product, branded service, or location/establishment may provide the available templates to the user, having approved promotions, specials, discounts, coupons, etc., at a particular "check-in" spot and based upon the connection between the geo-location, and/or the object, or branded product/service, or establishment's offer/coupon. Alternatively, the user may offer a template for review by the marketing administrator. The marketing administrator may be an automated computer system that checks for certain criteria or codes within the proposed user template in connection with approving same for use as a frame, overlay, underlay, or watermark over the user's media data object file. If approved, the user's own template may be used and combined with the user's media data object file to create a digital postcard for posting on the one or more of the user's social network groups.

Some templates may be offered for free, but a greater variety of templates may be available to users through a paid subscription service or other monetary model. This is ideal for use by marketing administrators who are always looking for a way to reach core customers, and mainstream web-based social network users who are eager to share their "experiences" in a new way.

An embodiment of the present invention may include connecting with social networks having a plug-in to their current check-in widgets within their mobile interfaces to the network.

In one embodiment of the present invention, there is provided a method for providing a communication between users of a computer network, comprising storing, in a database, received geo-location information from a user; providing to the user a subset of previously stored digital media templates from the database for user selection; combining a user-selected digital media template with a user-selected media data object file received from the user; and tagging the geo-location information to the combined user-selected digital media template and user-selected media data object file for communicating between users of the computer network.

The subset of previously stored digital media templates may be based upon the geo-location information received from the user. The subset may also be based upon object information or branded product service information. During the tagging step, the selected template may be populated with conglomerate information. The conglomerate information may comprise one or more of location name, location rating, and the user's past or current experience at the location, with an object or branded product/service information, and advertising information, or combinations thereof. The conglomerate information may also include crowd sourced information relating to location rating, past or current experience, along with object or branded product/service rating, and/or current or past experience with same. The media data object file received from the user may comprise a previously stored video, photograph, hologram, animated photograph sequence, or other media data object files, of or about the location, the object, the branded products/services, or any combinations thereof. The media data object file may further comprise text or audio data objects, added by the user to further enhance the social proofing of the user's experience.

The media data object file provided by the user may also comprise a presently created media data object of or about the location, or any combinations thereof. The method may further comprise the step of posting the digital postcard on a computer network accessible by other users. The user-selected digital media template can be aligned to frame, overlay, underlay, or watermark the user-selected media data object file. The template may comprise specials, discounts, promotions, or coupons relating to the establishment where the user is located, or object (e.g., person or thing) or branded products/services that the user includes in the user's media data object file.

In another embodiment of the present invention, there is provided a method for providing an object or brand awareness opportunity between users of a computer network, comprising storing, in a database of a marketing administrator's computer network account, received geo-location information from a user; receiving, at the database of the marketing administrator's network account, a proposed uploaded user-created digital media template; if approved, combining the approved user-created digital media template with a user-selected media data object file received from the user; and tagging the geo-location information to the combined approved user-created digital media template and user-selected media data object file for communicating between users of the computer network.

In yet another embodiment of the present invention, there is provided a computer system for posting geo-location specific advertising and marketing from a user onto a computer network, comprising a database, for storing received geo-location information from a user and for providing to the user a subset of previously stored digital media templates, the provided subset based upon received geo-location information; a process engine for combining a user-selected digital media template with a user-selected media data object file received from the user at the geo-location; and a tagging file for including tagged geo-location information to the combined user-selected digital media template and user-selected media data object file for posting on the computer network.

To accomplish the foregoing and related ends, certain illustrative aspects are described herein in connection with the following description and the annexed drawings. These aspects are indicative of the various ways in which the principles disclosed herein can be practiced and all aspects and equivalents thereof are intended to be within the scope of the claimed subject matter. Other advantages and novel features will become apparent from the following detailed description when considered in conjunction with the drawings.

BRIEF DESCRIPTION OF THE DRAWINGS

The above examples and still further features and advantages of the present invention will become apparent upon consideration of the following detailed description of embodiments thereof, especially when taken in conjunction with the accompanying drawings wherein like reference numerals in the various figures are utilized to designate like components, and wherein:

FIGS. 10A, 10B, 10C, and 10D depict illustrative examples of a synthesized digital postcard of the templates of FIGS. SA, SB, SC, and SD overlaid onto the media data objects of FIGS. 9A and 9B in accordance with an embodiment of the present invention;

Figure 1:
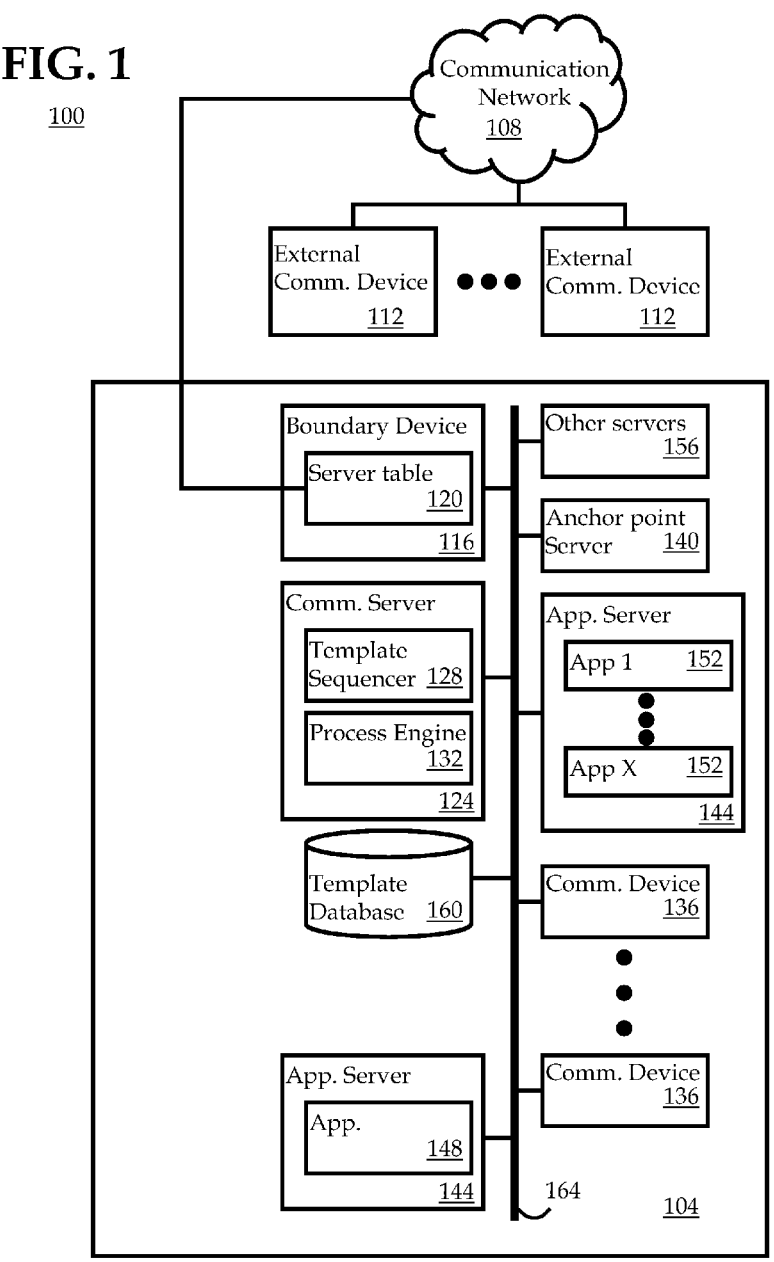
FIG. 1 is a block diagram depicting a social network computer communication system in accordance with an embodiment of the present invention.

The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include", "including", and "includes" mean including but not limited to. To facilitate understanding, like reference numerals have been used, where possible, to designate like elements common to the figures. Optional portions of the figures may be illustrated using dashed or dotted lines, unless the context of usage indicates otherwise.

DETAILED DESCRIPTION

In the following detailed description, numerous specific details are set forth in order to provide a thorough understanding of embodiments or other examples described herein. In some instances, well-known methods, procedures, components and circuits have not been described in detail, so as to not obscure the following description. Further, the examples disclosed are for exemplary purposes only and other examples may be employed in lieu of, or in combination with, the examples disclosed. It should also be noted the examples presented herein should not be construed as limiting of the scope of embodiments of the present invention, as other equally effective examples are possible and likely.

The disclosure will be illustrated below in conjunction with an exemplary social network communication system. Although well suited for use with, e.g., a system using a server(s) and/or database(s), the disclosure is not limited to use with any particular type of communication system, network, or configuration of system elements. Those skilled in the art will recognize the disclosed techniques may be used in any communication application in which it is desirable to utilize applications in a peer-to-peer network, or internet network.

The exemplary systems and methods of this disclosure will also be described in relation to software, modules, and associated computing hardware. However, to avoid unnecessarily obscuring the present disclosure, the following description omits well-known structures, components and devices that may be shown in block diagram form, are well known, or are otherwise summarized.

The term "marketing administrator" may refer to location, object representatives, brand administrators, or other end users, who intend to use templates they are providing or may simply refer to the branded product/service, object, or location advocates wishing to extend a more organic form of location, object or brand awareness and recognition through the end user's use of the provided templates with their own personal digital media object files to be shared among each user's social network—thereby acting as "social proof" among that particular user's social circles. Such social proof provides the most powerful form of marketing, also known as "word of mouth" marketing, or personally endorsed marketing or referral marketing.

The terms "switch," "server," "contact center server," or "contact center computer server" as used herein should be understood to include a Private Branch Exchange ("PBX"), an Automated Contact Distribution ("ACD") system, an enterprise switch, IP switch, or other type of telecommunications system switch or server, as well as other types of processor-based communication control devices such as, but not limited to, media servers, computers, adjuncts, and the like.

As used herein, the term "module" refers generally to a logical sequence or association of steps, processes or components. For example, a software module may comprise a set of associated routines or subroutines within a computer program. Alternatively, a module may comprise a substantially self-contained hardware device. A module may also comprise a logical set of processes irrespective of any software or hardware implementation.

As used herein, the term "gateway" may generally comprise any device that sends and receives data between devices. For example, a gateway may comprise routers, switches, bridges, firewalls, other network elements, and the like, any and combination thereof.

As used herein, the term "transmitter" may generally comprise any device, circuit, or apparatus capable of transmitting an electrical signal.

The term "computer-readable medium" as used herein refers to any tangible storage and/or transmission medium that participate in storing and/or providing instructions to a processor for execution. Such a medium may take many forms, including but not limited to, non-volatile media, volatile media, and transmission media. Non-volatile media includes, for example, NVRAM, or magnetic or optical disks. Volatile media includes dynamic memory, such as main memory. Common forms of computer-readable media include, for example, a floppy disk, a flexible disk, hard disk, magnetic tape, or any other magnetic medium, magneto-optical medium, a CD-ROM, any other optical medium, punch cards, paper tape, any other physical medium with patterns of holes, RAM, PROM, EPROM, FLASH-EPROM, solid state medium like a memory card, any other memory chip or cartridge, a carrier wave as described hereinafter, or any other medium from which a computer can read.

A media data object file attachment to e-mail or other self-contained information archive or set of archives is considered a distribution medium equivalent to a tangible storage medium. When the computer-readable media is configured as a database, it is to be understood the database may be any type of database, such as hierarchical, object-oriented, and/or the like. Accordingly, the disclosure is considered to include a tangible storage medium or distribution medium and prior art-recognized equivalents and successor media, in which the software implementations of the present disclosure are stored.

One or more embodiments of the present invention may utilize Session Initiation Protocol (SIP) as a communication protocol. SIP is a communications protocol that is known and described in Internet Engineering Task Force (IETF) Request For Comment (RFC) 3261, the content of which is hereby incorporated by reference in its entirety. SIP is an open signaling protocol for establishing many kinds of real-time communication sessions. Examples of the types of communication sessions that may be established using SIP include voice, video, and/or instant messaging. SIP also facilitates peer-to-peer communication sessions. These communication sessions may be carried out on any type of communication device such as a personal computer, laptop computer, personal digital assistant, telephone, mobile phone, cellular phone, smart phone, digital tablet, or the like. One feature of SIP is its ability to use an end-user's Address of Record (AOR) as a single unifying public address for all communications. Thus, in a world of SIP-enhanced communications, a user's AOR becomes their single address that links the user to all of the communication devices associated with the user. Using this AOR, a caller can reach any one of the user's communication devices or endpoints, also referred to as User Agents (UAs) without having to know each of the unique device addresses or phone numbers.

Users or any other addressable entities in a SIP framework are identified by Universal Resource Identifiers (URI). Each such Internet-style address (for example, sip: johndoe@gmail.com) maps into one or more contacts, each of which typically represents a device or service at which the corresponding user may be reached. Examples are mobile devices, including but not limited to, phones, smart phones, desktop multimedia clients, digital tablets, instant message accounts, email accounts, and so on. The SIP framework is responsible for routing a request for a peer-to-peer session addressed to a given URL to one or more appropriate contacts for that URL. The framework may utilize information about the preferences, presence and location of the user identified by the URL, to determine the most appropriate contacts. The protocol also provides mechanisms to specify the type of session that is requested as well as means to change session parameters.

SIP is not a vertically integrated communications system. SIP is rather a component that can be used with other IETF protocols to build a complete multimedia architecture. Typically, these architectures will include protocols such as RTP (RFC 3550) for transporting real-time data and providing QoS feedback, the Real-Time streaming protocol (RTSP) (RFC 2326) for controlling delivery of streaming media, the Media Gateway Control Protocol (MEGACO) (RFC 3015) for controlling gateways to the Public Switched Telephone Network (PSTN), and the Session Description Protocol (SDP) (RFC 2327) for describing multimedia sessions. Therefore, SIP should be used in conjunction with other protocols in order to provide complete services to the users. However, the basic functionality and operation of SIP does not depend on any of these protocols.

FIG. 1 depicts a communication system 100 according to an embodiment of the present disclosure. The communication system 100 may include an enterprise network 104 that is in communication, via a (typically untrusted or unsecure or public) communication network 108, with one or more external communication devices 112a and/or 112b (collectively, 112). The external communication devices 112 are generally referred to as "external" because they are either not under the direct control of the enterprise administering the enterprise network 104 or have a decreased level of trust with the enterprise network 104 as compared with communication devices 136 that are within the enterprise network 104. Exemplary types of external communication devices 112 include, without limitation, stationary or mobile devices including but not limited to cellular phones, smart phones, laptops, Personal Computers (PCs), personal digital assistants (PDAs), digital phones, analog phones, mobile digital tablets, and the like.

The communication network 108 may be packet-switched and/or circuit-switched. An exemplary communication network 108 includes, without limitation, a Wide Area Network (WAN), such as the Internet, a Public Switched Telephone Network (PSTN), a Plain Old Telephone Service (POTS) network, a cellular communications network, or combinations thereof. In one configuration, the communication network 108 is a public network supporting the TCP/IP suite of protocols.

The enterprise network 104 may include a boundary device 116 including a server table 120, a communication server 124 including a template sequencer 128 and a process engine 132, one or more internal communication devices 136, an anchor point server 140, one or more application servers 144, which may be capable of providing one application 148, or a set of different applications 152, a number of other servers 156, and a template database 160, all of which are interconnected by a (trusted or secure or private) Local Area Network (LAN) 164. Some or all of the functions depicted in FIG. 1 may be co-hosted and/or co-resident on a single server or may be a network of servers located at the site or in multiple locations. The depiction of components in FIG. 1 is generally intended to be a logical depiction of the components of the system 100.

The LAN 164 can be secured from intrusion by untrusted parties by a gateway and/or firewall located between the LAN 164 and communication network 108. In some embodiments, the boundary device 116 may include the functionality of the gateway and/or firewall. In some embodiments, a separate gateway or firewall may be provided between the boundary device 116 and the communication network 108.

The communications server 124 can include a Private Branch eXchange (PBX), an enterprise switch, an enterprise server, combinations thereof, or other type of telecommunications system switch or server. The communication server 124 is preferably configured to execute telecommunication functions between users and marketing administrators or users among themselves on one or more social networks via the internet or other communication network(s). Embodiments herein may refer to communication server 124 generically as a "session manager" for ease of reference.

Although only a single communications server 124 is depicted in FIG. 1, two or more communications servers 124 may be provided in a single enterprise network 104 or across multiple separate LANs 164 owned and operated by a single enterprise, or multiple enterprises, but separated by a communication network 108. In configurations where an enterprise or an enterprise network 104 includes two or more communications servers 124, each server 124 may comprise similar functionality, but may be provisioned for providing its features to only a subset of all enterprise users. In particular, a first communications server 124 may be authoritative for and services a first subset of enterprise users whereas a second communications server 124 may be authoritative for and services a second subset of enterprise users, where the first and second subsets of users generally do not share a common user. This is one reason why the network boundary device 116 may be provided with a server table 120.

Additionally, multiple servers 124 can support a common user community. For example, in geo-redundant configurations and other applications where users are not necessarily bound to a single application server, there may be a cluster of equivalent servers where a user can be serviced by any server in the cluster.

In accordance with at least some embodiments of the present invention, the mapping of user identities within a communication request does not necessarily have to occur at the network boundary device 116. For instance, the mapping between an authoritative server and a user may occur "behind" the network boundary device 116 within the enterprise network 104, WAN or the Internet.

In some embodiments, network boundary device 116 is responsible for initially routing communications within the enterprise network 104 to the communications server 124 responsible for servicing a particular user involved in the communication. For example, if a first enterprise user is being sent geo-location information, or object information or branded product/service information, by an external communication device 112, then the network boundary device 116 may initially receive the inbound request to receive the geo-location information, or object information or branded product/service information, determine that the request is directed toward the first enterprise user, e.g., a marketing administrator, other user, etc., reference the server table 120 to identify the authoritative communications server 124 for the first enterprise user, and route the inbound request to the authoritative communications server 124.

Likewise, communications between internal enterprise users (e.g., internal communication devices 136) may first be serviced by the originating user's authoritative communications server 124 during the origination phase of communications set-up. After the origination phase is complete, the authoritative communications server 124 of the terminating (or called) user may be invoked to complete the termination phase of communications set-up. In some embodiments, the communications server 124 for the originating and terminating user may be the same, but it is not necessarily required that the server be the same.

In situations where more than two enterprise users are involved in a communication session, authoritative communications servers 124 for each of the involved users may be employed without departing from the scope of the present invention. For example, marketing administrators and/or other users may be located at the same server or at different servers. Additionally, the authoritative communications servers 124 for each user may be in the same enterprise network 104 or in different enterprise networks 104, which are owned separately or by a common enterprise but are separated by the communication network 108.

Each communications server 124 includes a template sequencer 128 and a process engine 132. The process engine 132 for a communications server 124 is used to combine the chosen template with the user's media data object file for which it is authoritative. In particular, the process engine 132 may be accessible by users and/or by marketing administrative personnel. The combined template and media data object file for a particular user are synchronized by the template sequencer 128 to tag the geo-location information, and/or the object information and/or the branded product/service information, from the user with the newly created digital postcard. The template sequencer 128 can actually provide communication features directly into the communication session or the template sequencer 128 can determine an application sequence, which will be invoked during tagging, synthesizing of the template to the media data object file, and used during the communication session.

In accordance with at least some embodiments, the template sequencer 128 can determine an application sequence and cause one or more applications 148, 152 to be sequenced into a communication session. In particular, the template sequencer 128 is configured to analyze a particular user's geo-location, object identification, branded product/service information, and related template choice or proposed template from user, and invoke the necessary applications to fulfil such preferences. Once an application sequence is determined by the template sequencer 128, the communications server 124 passes the established combined file, or digital postcard to a first application in the application sequence, thereby allowing the first application to determine the parameters of the digital postcard, insert itself into the control and/or media stream of the communication session, and thereby bind itself to the communication session to allow the newly combined digital postcard to be sent to the user for posting on one or more social networks. Alternatively, the digital postcard may be stored and accessible at a later time during an access composition request by the same user, a different mobile user or users, or other administrators or users on the communication network.

Once the first application has inserted itself into the communication session, the first application either passes the established digital postcard back to the template sequencer 128 for marketing administrator approval or passes the established digital postcard directly to a second application in the application sequence. Alternatively, or in addition, the digital postcard may be redirected, rejected, or the like. Moreover, parties and/or media servers may be added to the session by an application. As can be appreciated, the process continues until all applications have been included in the communication session and the process can be duplicated for each of the users involved in the communication session.

Although only two application servers 144 are depicted, one skilled in the art will appreciate the one, two, three, or more applications servers 144 can be provided and each server may be configured to provide one or more applications. The applications provided by a particular application server 144 may vary depending upon the capabilities of the server 144 and in the event that a particular application server 144 comprises a set of applications 152, one, some, or all of the applications in that set of applications 152 may be included in a particular application sequence. There is no requirement, however, that all applications in a set of applications 152 be included in an application sequence and there is no requirement as to the order in which applications are included in the application sequence. Rather, the application sequence is usually determined based on a user's or administrator's template preferences, which can be processed in the process engine 132. Alternatively, or in addition, the applications that appear in a user's sequence vector and their order within that vector may be determined by a system administrator to satisfy business requirements.

Moreover, the application sequence can vary based on the media type(s) that are being used in the communication session. For instance, a user may have a first set of preferences for photographic data communications, a second set of preferences for video-based communications, and a third set of preferences for text-based or audio-based communications. Additionally, a user may have preferences defining preferred media types and rules for converting communication sessions from one media type to another different media type. Still further, a user may have preferences defining the manner in which multi-media communications are established and conducted.

The applications included in a particular application sequence are generally included to accommodate the user's preferences. Applications may vary according to media-type, function, and the like. Exemplary types of applications include, without limitation, an EC-500 (extension to cellular) application, an email application, a video application, a text application, a geo-location log service, a security application, an encryption application, a collaboration application, a whiteboard application, mobility applications, presence applications, media applications, messaging applications, bridging applications, bar code or QR code applications, object identification applications, digital template applications, product/service brand applications, and any other type of application that can supplement or enhance communications. Additionally, one, two, three, or more applications of a given type can be included in a single application sequence without departing from the scope of the present invention.

Embodiments of the present invention are largely comprised of a set of different software entities working in harmony on an existing architecture (e.g., the web) and integrating with other established or non-established social networking and location-based applications (or object or brand-based, or experience-based applications). Software may also be responsible for synthesizing the existing and new personalized digital data to create a new media data object file for distribution locally or within and throughout a social network or social networks.

Embodiments of the present invention may utilize the communication system of FIG. 1 to allow for users to generate their own media template data for free market distribution and financial gain through a separate interface. A marketing administrator or designer may utilize the system of FIG. 1 to create a "digital postcard template" that users/consumers can search for and combine with their own media data object file captured at a particular location, with a particular object (e.g., person or thing) or with a branded product/service. When that consumer uploads the digital postcard to his or her social media network(s), the information from the user may be synthesized with centrally accessed information about the business location, object, or product/service being endorsed and socially proven by the user who created the media data object file.

For example, a marketing administrator for a particular location, or object, or branded product can provide a template showing a beer mug (e.g., object) with a transparent section the user can then position their personal photograph behind to give the "fun" appearance of floating inside the beer mug. The consumer thus generates a funny keepsake from a night out at a particular place, and the logo for that business may be forwarded through that user's social network utilizing the communication system of FIG. 1.

All template designs and download statistics may be tracked and analyzed, so end users may be able to see which templates are the most popular at their particular location. Any promotion or coupon offered by a business, or object (e.g., "That's me with Smokey Robinson, who is appearing tonight at Venue A. Bring this digital postcard and get a ticket to the show for haft price!"), or branded product/service to the consumer (the user side sees these as "gifts" or "souvenirs" or "offers" from the object or brands, locations, or experiences they visit) can also be organized and/or recommended according to popularity. This crowd sourcing feature may or may not be used in one or more of the user sessions.

Consumers who are particularly active in personal experience and using templates may or may not be able to be paid by a willing establishment, object or branded product/service owner, based on the number of times their template is distributed throughout their social network(s). For template designers, they may be able to strike a deal with a willing location, object or brand owner and make money based on the number of times their template is selected by consumers. As such, designers may have a way of tracking downloads and keep a monthly "budget." This system may help to ensure that templates remain creative, unique, meaningful, fun, and as fresh as possible.

Individual businesses may also be paid by establishments, objects or branded product/service owners they sponsor on their templates, based on how many times their template is shared and viewed or by some other means of monitory compensation. End users may be able to create their own templates or alter marketing media templates, as well with a possible set of media editing tools.

Figure 2:
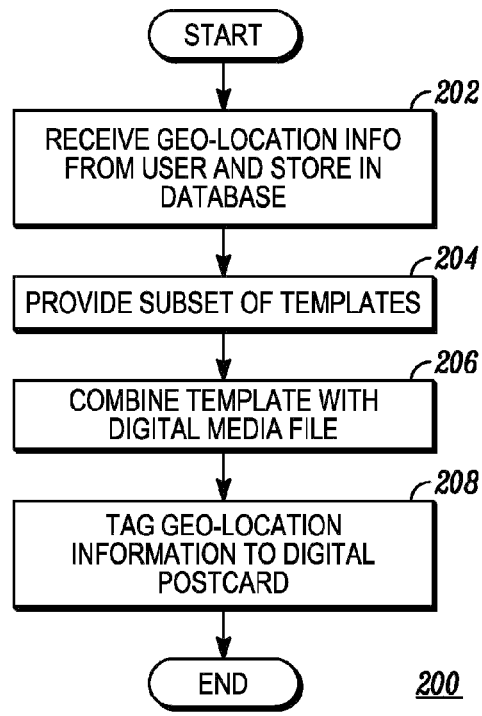
FIG. 2 is a flow chart depicting a method in accordance with an embodiment of the present invention.

FIG. 2 depicts a method 200 in accordance an embodiment of the present invention that may be used to implement many of the features discussed hereinabove. The method may be performed using the communications system discussed in detailed with regard to FIG. 1.

The method starts with a user making a request, via the user's smart phone, for example, to the communication system 100 described in FIG. 1, to create a digital postcard. The user's geo-location information is sent to the communication system 100. Alternatively (not shown), other information, e.g., object information, branded product/service information, user experience, and the like may be sent to the communication system 100 as well. At step 202, the user's geo-location or other information is stored, for example, in the template database 160. Through a known process utilizing the processes of the database, for example, as a relational database having a look up table, the geo-location or other information of the user is compared to the previously stored templates. Based upon the geo-location, or other information, a subset of the set of templates stored in the template database 160 is then provided at step 204 to the user for choosing. For example, if the user provides geo-location information about Venue A, a subset of templates relating to Venue A are provided to the user. Alternatively, or in combination, if the user provides a famous person to the template database 160, then a subset of templates relating to that famous person is provided to the user. Similarly, if the user provides particular branded product information to the system 100, a subset of templates relating to that particular product is then sent to the user.

Once the user chooses a template from the supplied subset of templates, the user provides a media data object file to the system 100 and at step 206, the system 100 combines the user-selected template with the user-selected and sent media data object file, creating a digital postcard. Finally at step 208, the system 100 tags or synthesizes the combined template and media data object file with the geo-location information, object information, branded product/service information, or any other information provided by the user, and sends the tagged file to the user. The user may then post the digital postcard on one or more social media networks. The method then ends until the user makes a new request.

The subset of templates may be utilized more than once by the same user provided the user is located in the same geo-location, or is relating to same object or is endorsing the same branded product/service. In this regard, for example, the user may spend the night at a sports bar and on occasions begin a session whereby the user sends a request for a subset of templates and performs the steps mentioned above whereby each time a template is chosen, the template and media data object file may be the same, similar, different or combinations thereof.

In one embodiment of this method, during the tagging step 208, conglomerate information may be populated into the template before sending to the user. For example, the conglomerate information may include location name, rating, or the user's past or current experience at that location or establishment. The conglomerate information may also include crowd sourced information relating to location rating, past or current experience, along with object information, or branded product/service information like rating, and/or current or past experience with same. This conglomerate information may be generated from crowd sources and thus be a combination of ratings or experiences from many. In addition, the conglomerate information may include object or branded product/service information from the crowd sourcing. For example, the template may be populated with an advertisement of a particular beer that the user drinks while at the current location.

In addition, the conglomerate information may include marketing and advertising information about the establishment, the object or branded product/services, or a combination of all of the above. Such marketing and advertising information may include promotions, specials, discounts, or coupons associated with the establishment, the object, or branded products/services, or any combination of this information.

The template may be aligned with the user-selected media data object file by way of an overlay, underlay, frame, or watermark, which may include advertising indicia of the establishment, or the object, or branded product/service, or experience being featured by the user.

Figure 3:
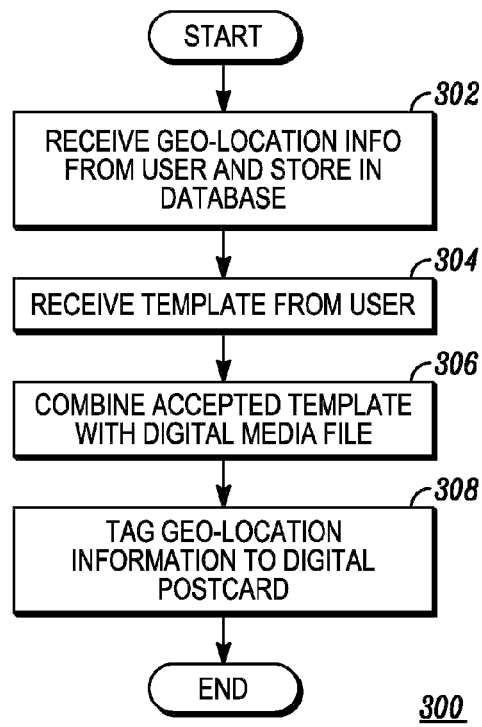
FIG. 3 is a flow chart depicting a method in accordance with an embodiment of the present invention.

FIG. 3 depicts a method in accordance with another embodiment of the present invention. This method is directed to providing a location, or object, or brand awareness, or experience opportunity between and among users of a computer network, e.g., the Internet. The method starts with a user making a request, via the user's smart phone, for example, to the communication system 100 described in FIG. 1, to create a digital postcard. The user's geo-location information, object information, branded product/service, and/or experience information, is sent to the communication system 100. At step 302, the user's geo-location information, or other information is stored, for example, in the template database 160 of a marketing administrator's network account. At step 304, the system receives a template created by, and submitted by, the user. The user requests approval by the marketing administrator. The user also provides a media data object file to the system 100 and at step 306, if the template is approved, then the system 100 combines the approved template with the user-selected media data object file, thus creating a digital postcard. Finally at step 308, the system 100 tags or synthesizes the combined accepted template and media data object file with the geo-location information, object information, branded product/service information, experience information, and the like, and sends the tagged file to the user. The user may then post the digital postcard on one or more social media networks. The method then ends until the user makes a new request.

The subset of templates may be utilized more than once by the same user provided the user is located in the same geo-location or the other information previously provided remains the same. In this regard, the user may spend the night at a sports bar and on occasions begin a session whereby the user sends a request for a subset of templates and performs the steps mentioned above whereby each time the template and media data object file may be the same, different or combinations thereof.

In one embodiment of this method, during the tagging step 308, conglomerate information may be populated into the template before sending to the user. For example, the conglomerate information may include location name, rating, or the user's past or current experience at that location or establishment. As discussed above, this information may be from crowd sourcing methods. In addition, the conglomerate information may include object or brand information. For example, the template may be populated with an advertisement of a particular beer that the user drinks while at the current location or information about a famous person or experience.

In addition, the conglomerate information may include marketing and advertising information about the establishment, the object or branded product/service or a combination of all of them. Such marketing and advertising information may include promotions, specials, discounts or coupons associated with the establishment, the object or branded products/services, or any combination.

The template may be aligned with the user-selected media data object file by way of an overlay, underlay, frame, or watermark, which may include advertising indicia of the establishment, or the object, or branded product/service, or experience, being featured by the user.

Figure 4:
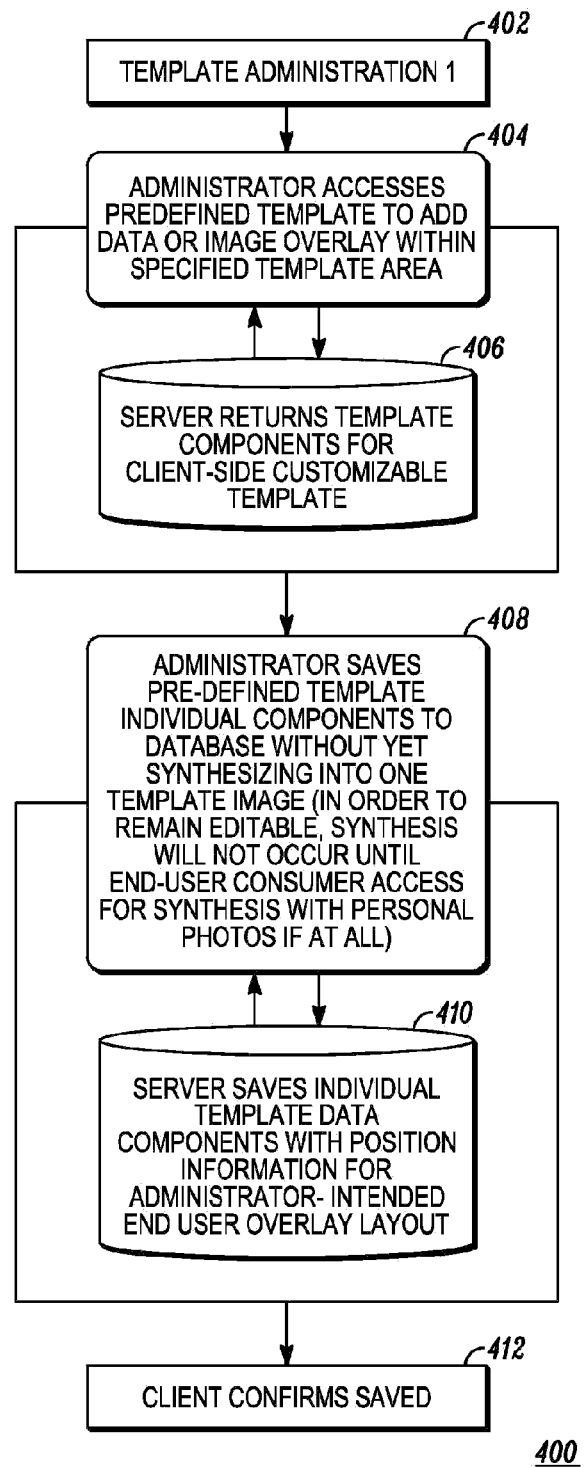
FIG. 4 is a flow chart of the creation of a template in accordance with an embodiment of the present invention.

FIG. 4 depicts a flow chart of the creation of a template in accordance with an embodiment of the present invention. At step 402, a user session begins with a request for a template and the template administration begins. At step 404, the administrator accesses predefined templates in which to add additional information, either one or more of text, audio, photograph, video, bar codes, QR codes, person identification information, experience information, all within specified template areas. At step 406 the template sequencer 128 of the communication server 124 returns template components for the user-side customizable template. At step 408, the administrator saves the pre-defined template individual components to the template database 160. Then at step 410, the server 124 saves individual template data components with geo-location or position information. The server 124 may also save other information (not shown) like object information, branded product/service information, experience information and the like. Finally, at step 412, the produced digital postcard is sent to the user and the user confirms and saves the postcard for posting on the user's one or more social media networks.

The now created digital postcard may be accessed by other users on the communication network 100, e.g., a mobile user. For example, a mobile user may arrive at the same geo-location, have the same object, e.g. beer mug, or own the same branded product, or have experienced the same branded service, as the user who created the digital postcard. Once the second, mobile user enters its geo-location, object information, branded product/service information, experience information, etc., the system may send the second mobile user the previously created digital postcard, thus providing information about the location, or object, or brands, or experiences or other. This information may include reviews, opinions, promotions, coupons, discounts, and the like, regarding the establishment, and/or the object and/or brands and/or experiences, featured on the digital postcard. This is merely one example contemplated by the present invention regarding "social proof" advertising. Other examples and variations are contemplated by and within the scope of this present invention.

Figure 5:
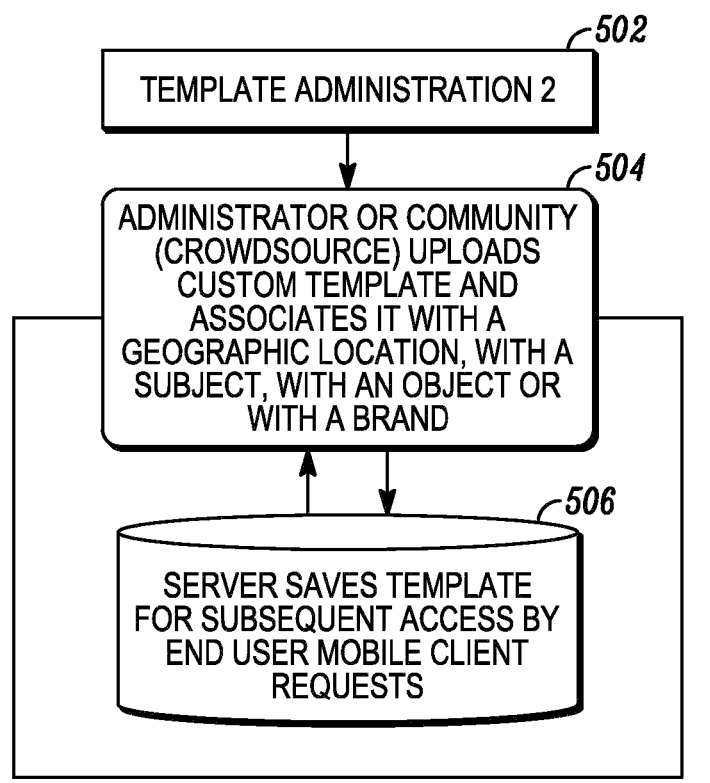
FIG. 5 is a flow chart of the creation of a template in accordance with an embodiment of the present invention.

FIG. 5 is a flow chart of the creation of a digital postcard in accordance with another embodiment of the present invention. At step 502, a user session begins with a request for a template and the template administration begins. At step 504, the administrator or community (crowd source) uploads a custom template and associates it with a geo-location, an object, a branded product/service, and/or experience. The information on the template may include either one or more of text, audio, photograph, video, all within specified template areas. At step 506, the administrator saves the template to the template database 160 for subsequent access by end users such as mobile end users. These end users may then make a mobile end user client request for the template.

Figure 6:
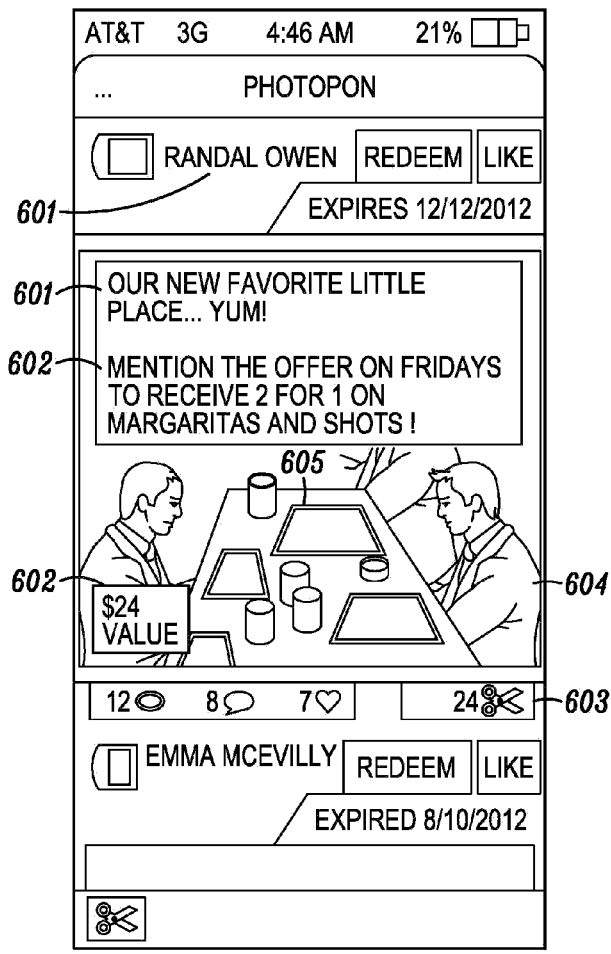
FIG. 6 depicts a digital postcard in accordance with an embodiment of the present invention.

FIG. 6 shows an example of a digital postcard 600 after the template has been populated and overlaid onto the user-selected media data object file, in this particular case a photograph 605 of the user 604 with his friends at a local establishment. The user's name and textual information 601 may be part of the template overlay, underlay, frame or watermark. In this particular example, the template overlay includes a discount coupon offer 602 amounting to a $24 value and shows that 24 users have accessed this digital postcard 603 and possibly have utilized or redeemed the coupon being offered.

Figure 7:
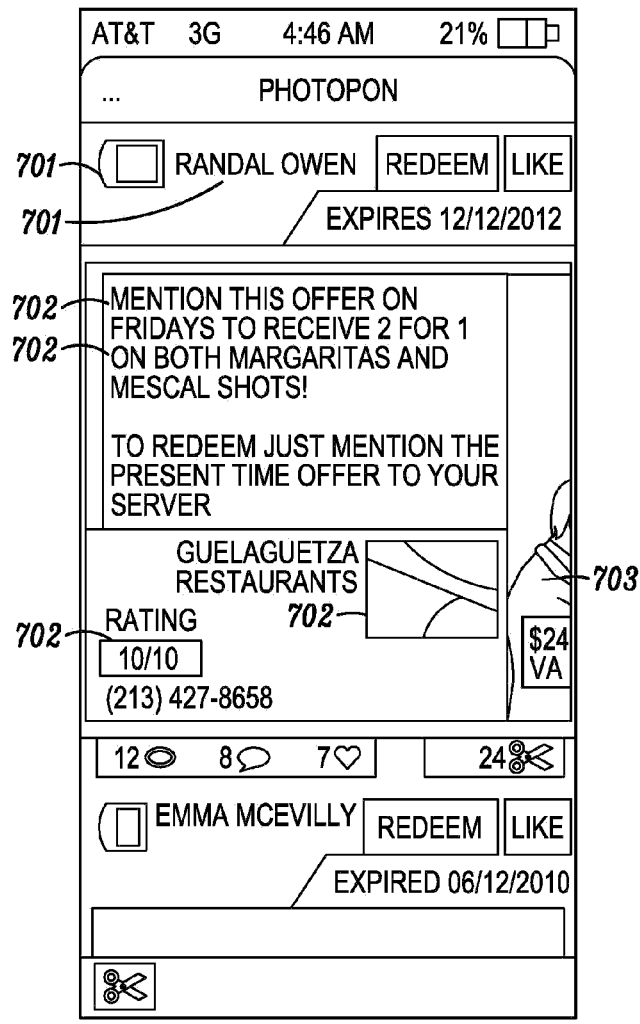
FIG. 7 depicts a set of templates that may be chosen to be overlaid onto the user's media data object file in accordance with an embodiment of the present invention.

FIG. 7 shows yet another example of a template overlay 700, highlighting the offer details from FIG. 6, where the user 703 includes his name 701 along with the offer overlay 702. Here, the composite digital postcard is placed off to the side in order to reveal more detailed coupon and/or location or the third party object or brand information in which the user is advocating through their photographed experience with that particular location, and/or object, and/or brand.

FIGS. 8A, 8B, 8C, and 8D illustrate a set of possible templates. These templates are prepared, for example, by a marketing administrator and not necessarily by the user. They are then stored in the template database of system 100 and utilized when a request is made by a user. Wherein, "marketing administrator" may refer to other end users who intend to use the templates they are providing or may simply refer to object or branded product/service, or location advocates wishing to extend a more organic form of object or brand awareness and recognition through the end user's use of the provided digital media templates with their own personal digital media to be shared among each user's social network—thereby acting as "social proof" among that particular user's social circles. Such social proof provides the most powerful form of marketing also known as "word of mouth" marketing or personal endorsed marketing or referral marketing.

Figure 8A:
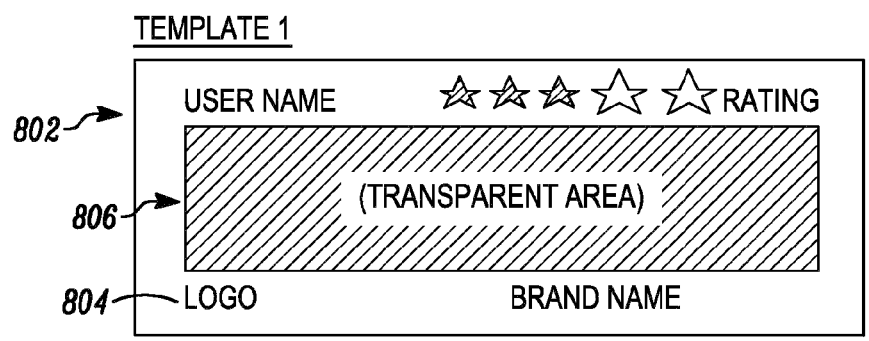
FIGS. 8A, 8B, 8C, and 8D depict illustrative examples of various, previously prepared, templates that include transparent areas for displaying user-generated media data objects in accordance with an embodiment of the present invention.
Figure 8B:
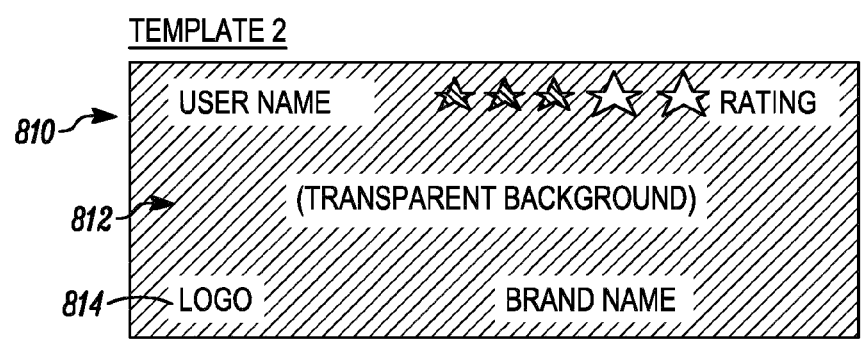

In FIG. 8A, there is a template 802, showing the indicia around the frame of the template 804 and smaller, framed transparent area 806 for inserting the user's media data object file. The transparent area 806 is denoted by the slanted lines behind the text, whereby the transparent area acts as a window that will display the user-generated media data object file beneath the object or branded/promotional template layer 804. This can either be a placeholder frame to house object or branded/promotional or personal user data, or public-generated data related to the object or brand or other non-object or brand data objects. For example, in FIG.

8B, there is a template 810, showing a variation wherein the indicia 814 are watermarked over the transparent portion 812.

Figures 8C, 8D:
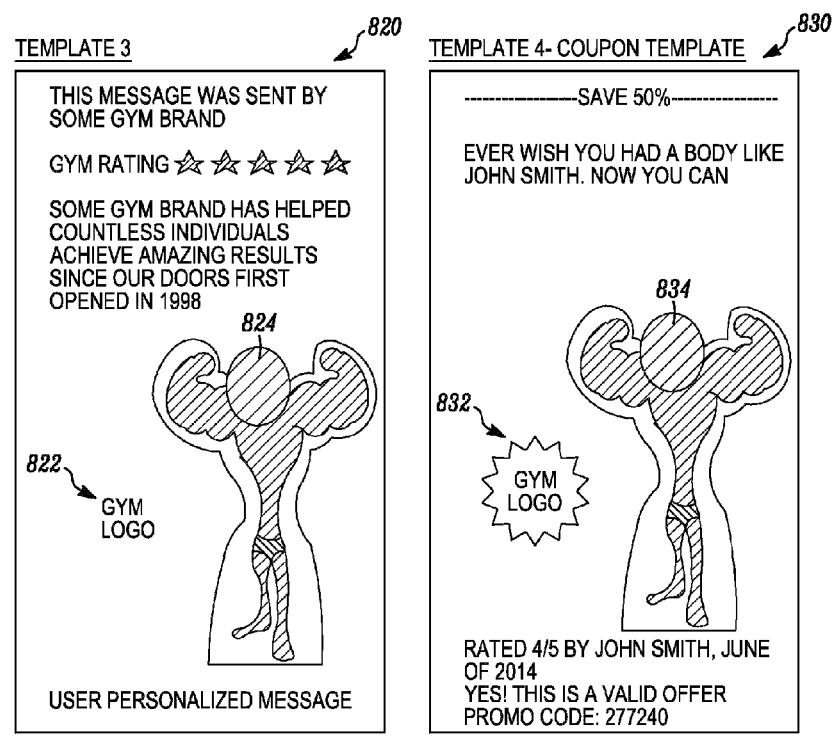

Here, a gym may wish to promote its branded service by having only its logo inside the template or can have a muscle man with the head missing in order for the user to superimpose his or her face in the background, which will create a stronger incentive for the user to share the synthesized image with his or her friends in various social networks because it is fun or humorous or whatever the personal reason they find in the template for re-sharing it. This thereby mutually benefits the location or object or brand providing these templates, whether paying or not paying. Template 820, as shown in FIG. 8C, shows another variation wherein, for example, a gym establishment has created an advertisement template for selling branded gym service, having indicia about the gym 822 and a transparent area 824 for allowing the user to place a media data object file of for example a photograph of the user's face. Template 830, as shown in FIG. 8D, depicts yet another version of template 820, with the template indicia 832 and transparent portion 834. Again, having the user's faced within the digital postcard provides social proof by the user of the gym service.

Figure 9A:
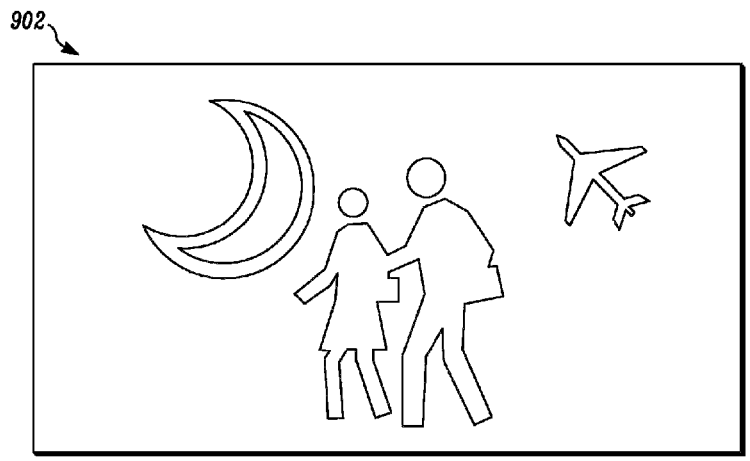
FIGS. 9A and 9B depict illustrative examples of two individually, user-generated media data objects in accordance with an embodiment of the present invention.
Figure 9B:
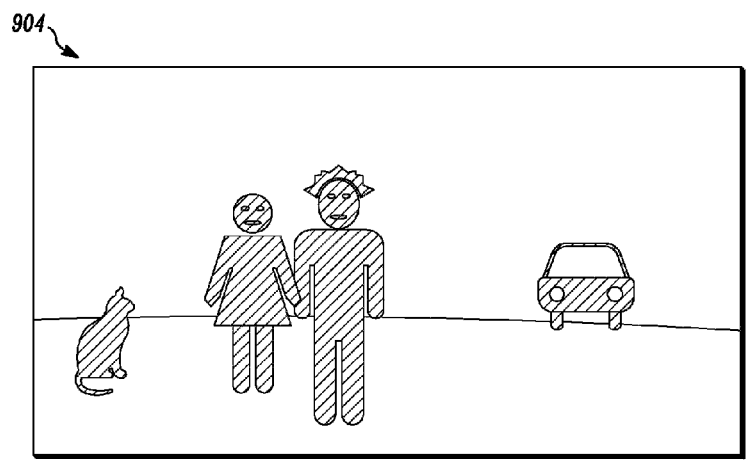

FIGS. 9A and 9B depict illustrations of two individual user-generated media data object files 902 and 904, respectively, for example, and through combining the chosen template with the user's media data object file will create a digital postcard.

Figure 10A:
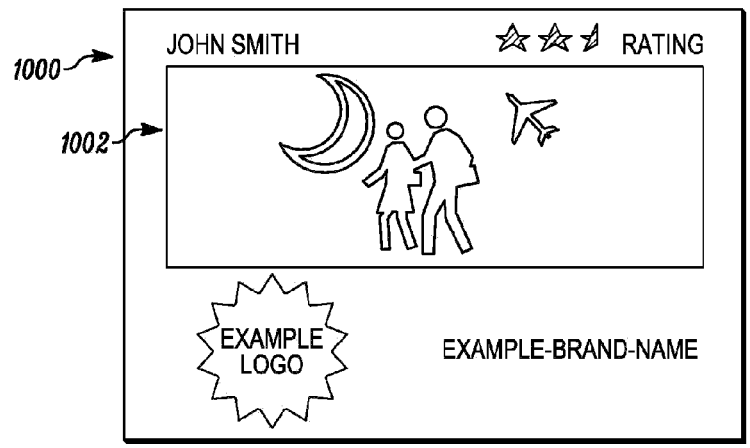
Figure 10B:
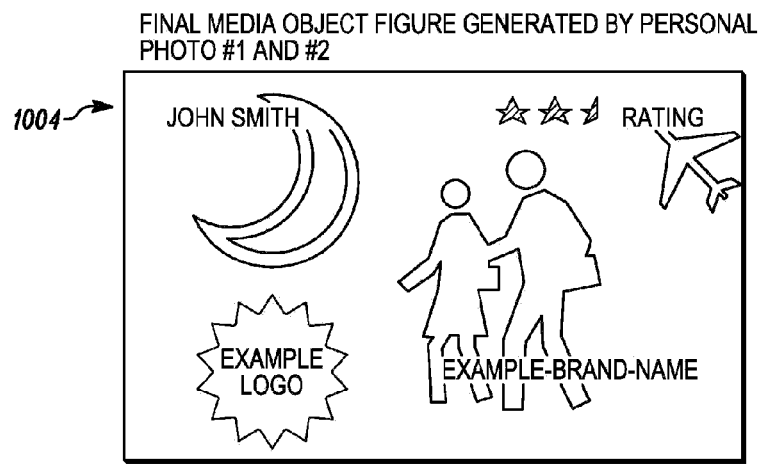

FIGS. 10A, 10B, 10C, and 10D depict illustrative examples of a final output representation of synthesized, personal and promotional/informational media data object files from, e.g., FIGS. 9A and 9B, with templates from, e.g., FIGS. 8A, 8B, 8C, and 8D. This type of digital postcard creates a more accurate portrayal and communication of the user's "experience" at the location, or with the object specified in the provided media template, or with the branded gym service. FIG. 10A shows a digital postcard 1000 that includes user created media data object file 902 of FIG. 9A, which in FIG. 10A is depicted as 1002, where template 802 in FIG. 8A is the original template (titled "template 1") in which the user selected to use with their selected digital media file or "photo" in this example. FIG. 10B shows a digital postcard 1004 that includes media data object file 902 of FIG. 9A, as used in combination with template 810 of FIG. 8B. FIG. 10C shows a digital postcard 1006 that includes a headshot from media data object file 904 of FIG. 9B into template 820 of FIG. 8C. Digital postcard 1008, as shown in FIG. 10D, is another example of the digital postcard of 1006, with different indicia of information.

Figure 11:
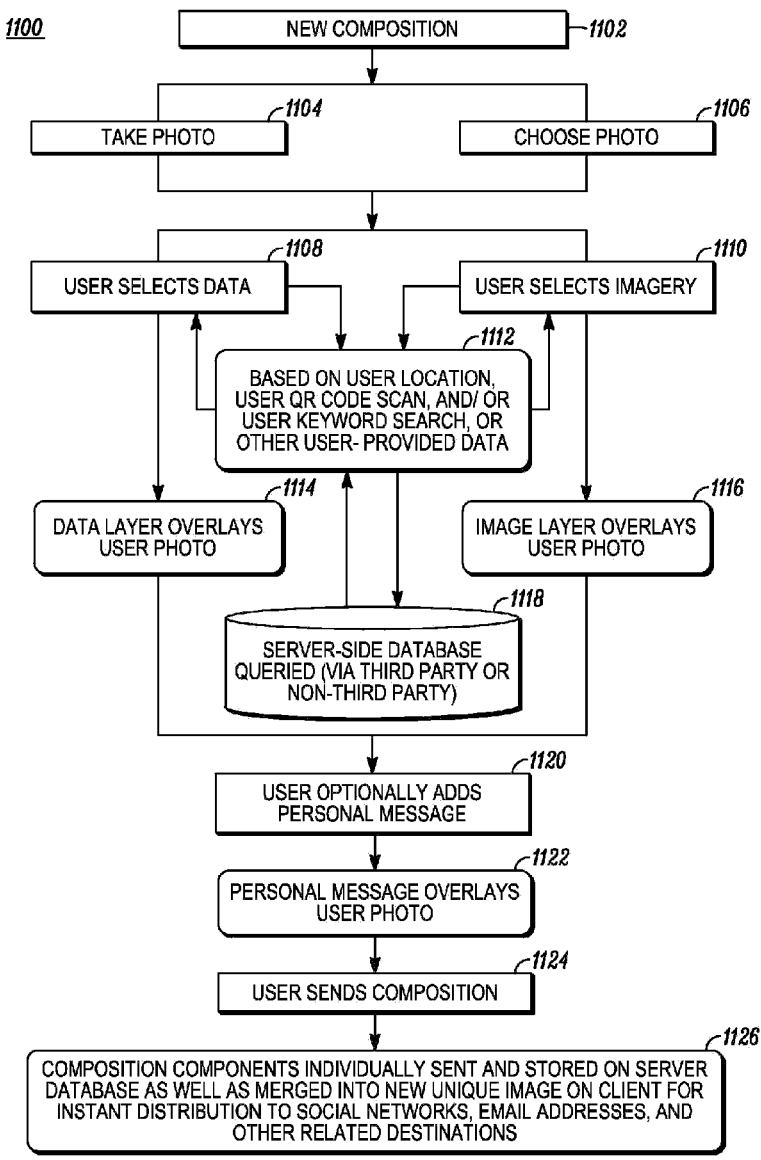
FIG. 11 depicts a flowchart of a user created digital postcard in accordance with an embodiment of the present invention.

FIG. 11 shows a flowchart of a user created digital postcard in accordance with an embodiment of the present invention. Wherein, a user visits a location, or interacts with a object, or branded product/service, takes a photograph 1104 (or video, hologram, etc.) documenting their experience at that location, or with that object, or branded product/service, and selects from a list of pre-existing templates and/or coupons 1108 that visually (and/or semantically if a coupon, discount, special promotion, etc.) identify that location, object, branded product/service, or experience, in order to enable subsequent viewers of the outputted media file to make an instantaneous cognitive association between the experience being described in the personal media data object file and the location, object or brand represented in the template (essentially bringing context to the visual social story being told in the user's personal media data object file).

Step 1104 depicts one of two ways a user can add a personal photograph (or video, hologram, etc.) to be combined with a selected existing template at a place, or for an object, or brand.

Step 1106 depicts an alternative to step 1104, wherein the user selects an existing personal media data object file (photo, video, hologram, etc.) to be used in the new composition. Step 1108 depicts the user selecting data provided as a coupon template detailing the offer associated with the subject intended for the user to showcase within his or her personal media file. Step 1110 is similar to step 1108 but is strictly image data for a less direct promotional approach, wherein the user selects a logo, mascot, or other form of imagery entirely unique to the object or location being showcased in the experience captured by the personal media file. Step 1112 depicts the context/nature in which templates requests are being made.

At step 1114, the client application overlays or underlays, frames or watermarks data (combines with personal media) from step 1108. At step 1116, the client application takes personal media and overlays, underlays, frames or watermarks, imagery selected in 1110. At step 1118, the server external database (either third party or non-third party) where template data resides, is queried. At step 1120, the user optionally adds personal (semantic) data in addition to personal visual media data object files, communicating experience with the object described in the template.

At step 1122, if opted in step 1120, the client application further overlays, underlays, frames or watermarks personal semantic data. At step 1124, the user sends the composition (either synthesized or kept separate as individual components for subsequent synthesis or non-synthesized rendering). At step 1126, the client application is processes through exemplary processing techniques from step 1124 subsequent to intentional user submission.

Figure 12:
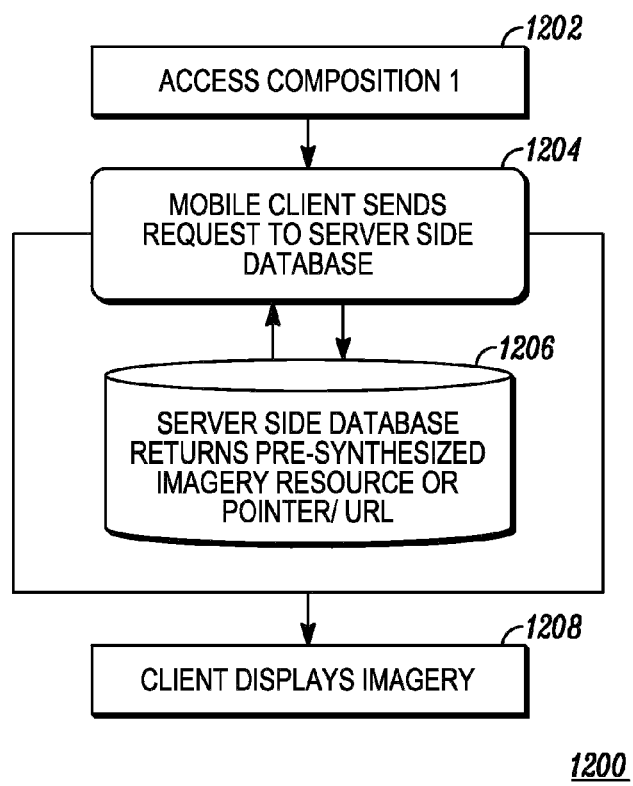
FIG. 12 depicts a flowchart of a mobile client accessing a previously created digital postcard in accordance with an embodiment of the present invention.

FIG. 12 shows a flowchart 1200 of how an end user would use a personal computing device to access and view an outputted final digital composition (precombined/synthesized) of another user's (or the same user's) personal photo and a template as previously combined and stored within the user's social network(s). At step 1202 the user initiates a request to access a composition. At step 1204, the mobile client sends a request to the server of FIG. 1, for example, for a digital postcard. At step 1206 the server database returns pre-synthesized imagery resources or pointer/URL to the mobile client. At step 1208, the client displays the imagery.

Figure 13:
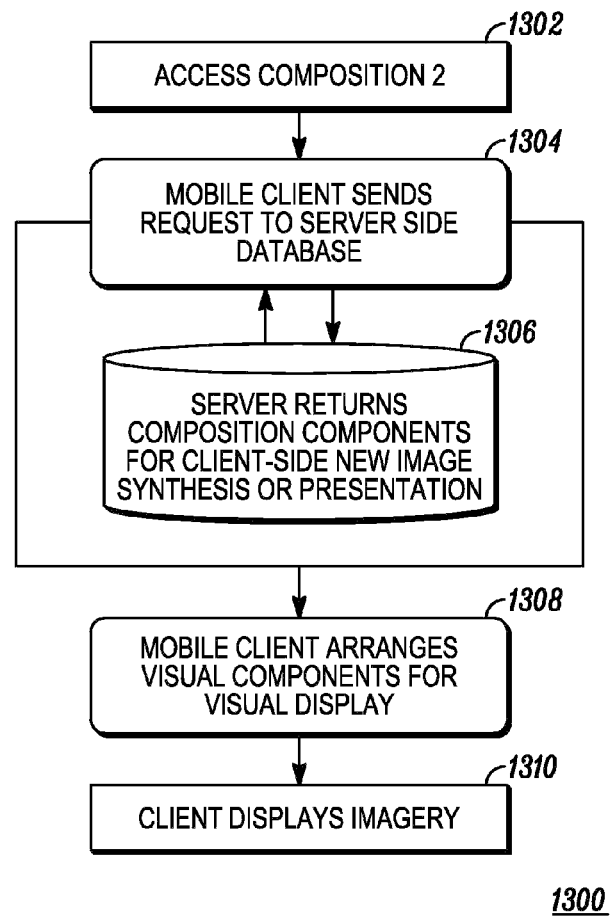
FIG. 13 depicts a flowchart of a mobile client accessing a previously created digital postcard in accordance with an embodiment of the present invention.

FIG. 13 shows a similar request 1300 as in FIG. 12 of a user request for a digital postcard. However, with composition/synthesis of visual components (personal visual media and selected template) occurring during point of access, and not point-of-creation. The visual components are stored separately to be composed by mobile client making the request. At step 1302, the client initiates a request. At step 1304, the mobile client sends a request to the server side database. At step 1306, the server returns composition components for client-side new image synthesis or presentation. Then, at step 1308, the mobile client arranges visual components for visual display. At step 1310, the client displays the imagery.

There are many advantages that can be gleaned from the above description of embodiments of the present invention. The following are merely examples of certain of them.

Any promotion or coupon offered by a business, or object, or brand to the consumer (the user side sees these as "gifts" or "souvenirs" from the object or brands, locations, or experiences they visit) can also be organized and/or recommended according to user's own experience or according to crowd sourced popularity. Consumers who are particularly active in checking in and using templates may or may not be able to be paid by a willing location, object or brand based on the number of times their template is distributed throughout their social network. For template designers, they may be able to strike a deal with a willing establishment, object or brand and make money based on the number of times their template is selected by other consumers. As such, designers may have a way of tracking downloads and keep a monthly "budget."

This system may help to ensure that templates remain creative, unique, meaningful, fun, and as fresh as possible. Individual businesses may also be paid by object or brands that they sponsor on their templates, based on how many times their template is shared and viewed. Or they can be paid by some other means of monitory compensation. End users may be able to create their own templates or alter provided marketing media templates as well with a possible set of media editing tools.

The foregoing descriptions of specific embodiments of the present invention have been presented for purposes of illustration and description. They are not intended to be exhaustive or to limit the present invention to the precise forms disclosed, and obviously many modifications and variations are possible in light of the above teaching. The exemplary embodiments were chosen and described in order to best explain the principles of the present invention and its practical application, to thereby enable others skilled in the art to best utilize the present invention and various embodiments with various modifications as are suited to the particular use contemplated.

What has been described above includes examples of the disclosed architecture. It is, of course, not possible to describe every conceivable combination of components and/or methodologies, but one of ordinary skill in the art may recognize many further combinations and permutations are possible. Accordingly, the novel architecture is intended to embrace all such alterations, modifications and variations that fall within the spirit and scope of the appended claims. Furthermore, to the extent that the term "includes" is used in either the detailed description or the claims, such term is intended to be inclusive in a manner similar to the term comprising" as "comprising" is interpreted when employed as a transitional word in a claim.

What is claimed is:

1. A method for providing a communication between users of a computer network, comprising:
   storing, in a database, received geo-location information from a user;
   providing to the user a subset of previously stored digital media templates from the database for user selection, wherein the digital media templates comprise a respective indicia for a coupon;
   combining a user-selected digital media template with a user-selected media data object file received from the user; and
   tagging the geo-location information to the combined user-selected digital media template and user-selected media data object file in order to communicate between users of the computer network.

2. The method of claim 1, wherein the subset of previously stored digital media templates provided to the user is based upon the geo-location information received from the user.

3. The method of claim 1, wherein the subset of previously stored digital media templates may be used multiple times provided the geo-location information of the user remains substantially the same.

4. The method of claim 1, wherein during the tagging step, the user selected template is populated with conglomerate information.

5. The method of claim 4, further comprising the step of aligning the populated template with the user-selected media data object file.

6. The method of claim 5, further comprising the step of synthesizing the populated template with the user-selected media data object file to form a digital postcard.

7. The method of claim 4, wherein the conglomerate information comprises one or more of: location name, location rating, and the user's past or current experience at the location, object or branded product/service information, experience information, advertising information, coupon information, or any combinations thereof.

8. The method of claim 1, wherein the media data object file received from the user comprises a previously stored video or photograph of or about the location, of or about an object or branded product/service, or any combinations thereof.

9. The method of claim 8, wherein the media data object file further comprises text or audio data.

10. The method of claim 1, wherein the media data object file provided by the user comprises a presently created video or photograph of or about the location, of or about an object or branded product/service, experience or any combinations thereof.

11. The method of claim 10, wherein the media data object file provided by the user comprises text or audio data.

12. The method of claim 6, further comprising the step of posting the digital postcard on a computer network accessible by other users.

13. The method of claim 5, wherein the user-selected digital media template can be aligned to frame the user-selected digital media with location promotion indicia, or object indicia, or brand coupon indicia, or experience indicia.

14. The method of claim 5, wherein the user-selected digital media template can be aligned to overlay, underlay, the user-selected digital media with location promotion indicia, or object, or brand coupon indicia, or experience indicia.

15. The method of claim 5, wherein the user-selected digital media template can be aligned to watermark the user-selected digital media with location promotion indicia, or object indicia, or brand coupon indicia, or experience indicia.

16. A method for providing a object or brand awareness opportunity between users of a computer network, comprising:
   storing, in a database of a marketing administrator's computer network account, received geo-location information from a user;
   receiving, at the database of the marketing administrator's network account, a proposed uploaded user-created digital media template, wherein the digital media template comprises an indicia for a coupon;
   if approved, combining the approved user-created digital media template with a user-selected media data object file received from the user; and
   tagging the geo-location information to the combined approved user-created digital media template and user-selected media data object file in order to communicate between users of the computer network.

17. The method of claim 16, wherein the approved user-created digital media template may be used multiple times provided the geo-location information of the user remains substantially the same.

18. The method of claim 16, wherein during the tagging step, the approved user-created digital template is populated with conglomerate information.

19. The method of claim 18, further comprising the step of aligning the populated template with the user-selected media data object file.

20. The method of claim 19, further comprising the step of synthesizing the populated template with the user-selected media data object file to form a digital postcard.

21. The method of claim 18, wherein the conglomerate information comprises one or more of: location name, location rating, and the user's past or current experience at the location, or location promotion information, or object information, or branding information, advertising information, coupon information, or any combinations thereof.

22. The method of claim 16, wherein the media data object file received from the user comprises a previously stored video or photograph of or about the location, or the object, or the brand, or any combinations thereof.

23. The method of claim 22, wherein the media data object file further comprises text or audio data.

24. The method of claim 16, wherein the media data object file provided by the user comprises a presently created video or photograph of or about the location, or the object or the brand, or any combinations thereof.

25. The method of claim 24, wherein the media data object file provided by the user comprises text or audio data.

26. The method of claim 20, further comprising the step of posting the digital postcard on a computer network accessible by other users.

27. The method of claim 18, wherein the populated digital media template is aligned to frame the user-selected media data object file with location promotion indicia, or object indicia, or experience indicia.

28. The method of claim 18, wherein the populated digital media template is aligned to overlay, underlay, the user-selected media data object file with location promotion indicia, or object indicia, or experience indicia.

29. The method of claim 18, wherein the populated digital media template is aligned to watermark the user-selected media data object file with location promotion indicia, or object indicia, or experience indicia.

30. A computer program product for enabling a computer to combine a digital template with a media data object file, comprising:
software instructions that enable the computer to perform predetermined operations; and
a tangible, non-transitory computer readable storage medium on which the software instructions are stored;
the predetermined operations including:
storing, in a database, received geo-location information from a user;
providing to the user a subset of previously stored digital media templates from the database for user selection, wherein the digital media templates comprise a respective indicia for a coupon;
combining a user-selected digital media template with a user-selected media data object file received from the user; and
tagging the geo-location information to the combined user-selected digital media template and user-selected media data object file in order to communicate between users of the computer network;
whereby the computer combines the digital template with a media data object file.

31. A method for providing a communication between users of a computer network, comprising:
storing, in a database, received object information from a user;
providing to the user a subset of previously stored digital media templates from the database for user selection, wherein the digital media templates comprise a respective indicia for a coupon;
combining a user-selected digital media template with a user-selected media data object file received from the user; and
tagging the object information to the combined user-selected digital media template and user-selected media data object file in order to communicate between users of the computer network.

32. The method of claim 31, wherein the subset of previously stored digital media templates provided to the user is based upon the object information received from the user.

33. A method for providing a communication between users of a computer network, comprising:
storing, in a database, received brand information from a user;
providing to the user a subset of previously stored digital media templates from the database for user selection, wherein the digital media templates comprise a respective indicia for a coupon;
combining a user-selected digital media template with a user-selected media data object file received from the user; and
tagging the brand information to the combined user-selected digital media template and user-selected media data object file in order to communicate between users of the computer network.

34. The method of claim 33, wherein the subset of previously stored digital media templates provided to the user is based upon the brand information received from the user.

35. A method for providing a communication between users of a computer network, comprising:
accessing a digital photograph provided by a first user;
determining a geographic location of the first user;
combining a geographically-limited digital media template with the digital photograph to create a composite image, wherein the digital media template is available at the geographic location of the first user, and wherein the digital media templates comprise a respective indicia for a coupon; and
presenting the composite image to a second user.

36. The method of claim 35, wherein the geographically-limited digital media template comprises a template of a person.

37. The method of claim 36, wherein the template of a person does not pertain to a business.

38. The method of claim 36, wherein the template of a person further pertains to a location.

* * * * *